US011615230B2

(12) United States Patent
Jing (10) Patent No.: US 11,615,230 B2
(45) Date of Patent: Mar. 28, 2023

(54) WIDE RANGE CLOCK MONITOR SYSTEM (71) Applicant: Advanced Micro Devices, Inc., Santa Clara, CA (US)

(72) Inventor: Xiaoye Jing, Mountain View, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 193 days.

(21) Appl. No.: 17/125,328

(22) Filed: Dec. 17, 2020

(65) Prior Publication Data
US 2022/0198119 A1    Jun. 23, 2022

(51) Int. Cl.
*H03K 5/08* (2006.01)
*H03K 19/00* (2006.01)
*G06F 30/30* (2020.01)
*G06F 30/396* (2020.01)
*G01R 23/06* (2006.01)
*G06F 30/327* (2020.01)
*H03K 19/003* (2006.01)
*G06F 119/12* (2020.01)

(52) U.S. Cl.
CPC .......... *G06F 30/396* (2020.01); *G01R 23/06* (2013.01); *G06F 30/327* (2020.01); *H03K 5/08* (2013.01); *H03K 19/00384* (2013.01); *G06F 2119/12* (2020.01)

(58) Field of Classification Search
CPC ...... G06F 1/324; G06F 1/3296; G06F 1/3206; G06F 1/305; G06F 30/396; G06F 1/08; G06F 30/327; G06F 2119/12; H03K 19/00384; H03K 5/08; G01R 23/06
See application file for complete search history.

(56) References Cited

U.S. PATENT DOCUMENTS

| 5,790,841 | A | 8/1998 | Scherer et al. |
| 7,475,374 | B1 | 1/2009 | Johnson et al. |
| 7,543,163 | B2 * | 6/2009 | Kernahan ............. G06F 1/3203 |
| | | | 713/340 |
| 8,593,177 | B2 | 11/2013 | Iyer et al. |
| 9,348,656 | B2 * | 5/2016 | Presant ................... G06F 1/206 |
| 9,829,967 | B2 * | 11/2017 | Duell .................... G06F 1/3296 |
| 10,637,489 | B1 * | 4/2020 | Gora ................... H03M 1/0626 |
| 10,671,111 | B1 * | 6/2020 | Spaggiari .................. G06F 1/04 |
| 10,732,701 | B1 * | 8/2020 | Yong ........................ G06F 1/324 |
| 10,763,879 | B1 * | 9/2020 | Neto ..................... H03M 1/125 |
| 11,295,787 | B1 * | 4/2022 | Gunther ................. G11C 5/147 |

* cited by examiner

*Primary Examiner* — Vibol Tan
(74) *Attorney, Agent, or Firm* — Polansky & Associates, P.L.L.C.; Paul J. Polansky; Nathan H. Calvert (57) ABSTRACT A circuit and method are provided to monitor a clock for a data processor. The method includes receiving a clock signal and producing a first voltage proportional to a frequency of the clock signal. The first voltage is converted to a digital signal. During an initialization mode, the method ensures the clock signal is at a desired frequency and scales the digital signal using a first configurable ratio to produce a high threshold value. When changing from the initialization mode to an operating mode, the method ceases to scale the digital signal and maintains the high threshold value. During the operating mode, the method compares the digital signal to the high threshold value to determine if the clock signal has been increased in frequency beyond a desired level, and if so, triggers an overclock alert to a system management circuit of the data processor.

20 Claims, 4 Drawing Sheets

WIDE RANGE CLOCK MONITOR SYSTEM

BACKGROUND

Generally, a processor such as a central processing unit (CPU) or graphics processing unit (GPU) requires an external clock circuit which provides a reference clock signal based on which the processor generates internal clock signals which drive the various digital circuits within the processor. For the processor to function properly, the frequency of the reference clock signal should not vary up or down beyond a specified variation, which is different on different processors. Various conditions can cause a reference clock frequency to vary. For example, in a common practice known as "overclocking", a system user deliberately causes the reference clock frequency to increase beyond a specified limit in order to speed up the processor and improve performance. In another example, power supply variations, temperature variations, or circuit failures may cause the reference clock to vary in frequency.

Current solutions for monitoring the frequency of the reference clock signal typically employ phase-locked loops (PLLs) and other circuits such as sampling circuits. Such solutions tend to consume a lot of power and occupy a lot of space on the processor chip.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A clock monitor includes a frequency to voltage conversion circuit, an analog to digital converter, and a digital monitoring circuit. The frequency to voltage conversion circuit has a first input receiving a reference voltage, a second input receiving a clock signal having a frequency, and an output providing an output voltage proportional to the frequency of the clock signal. The analog to digital converter has an input receiving the output voltage of the frequency to voltage conversion circuit and producing a digital signal representing the output voltage. The digital monitoring circuit operates to, during an initialization mode, scale the digital signal using a first configurable ratio to produce a high threshold value. When changing from the initialization mode to an operating mode, the digital monitoring circuit ceases to scale the digital signal and maintains the high threshold value. During the operating mode, the digital monitoring circuit compares the digital signal to the high threshold value to determine if the clock signal has been increased in frequency beyond a desired level, and if so, triggers an overclock alert.

A method monitors a clock for a data processor. The method includes receiving a clock signal and producing a first voltage proportional to a frequency of the clock signal. The first voltage is converted to a digital signal. During an initialization mode, the method ensures the clock signal is at a desired frequency and scales the digital signal using a first configurable ratio to produce a high threshold value. When changing from the initialization mode to an operating mode, the method ceases to scale the digital signal and maintains the high threshold value. During the operating mode, the method compares the digital signal to the high threshold value to determine if the clock signal has been increased in frequency beyond a desired level, and if so, triggers an overclock alert to a system management circuit of the data processor.

A processor includes a processor core, a clock generation circuit, and a reference clock monitor. The clock generation circuit receives a reference clock signal and provides a system clock signal based on which the processor core operates. The reference clock monitor includes a frequency to voltage conversion circuit, an analog to digital converter, and a digital monitoring circuit. The frequency to voltage conversion circuit has a first input receiving a reference voltage, a second input receiving the reference clock signal, and an output providing an output voltage proportional to the frequency of the clock signal. The analog to digital converter has an input receiving the output voltage of the frequency to voltage conversion circuit, and produces a digital signal representing the output voltage. The digital monitoring circuit operates to, during an initialization mode, scale the digital signal using a first configurable ratio to produce a high threshold value. When changing from the initialization mode to an operating mode, the digital monitoring circuit ceases to scale the digital signal and maintains the high threshold value. During the operating mode, the digital monitoring circuit compares the digital signal to the high threshold value to determine if the clock signal has been increased in frequency beyond a desired level, and if so, triggers an overclock alert.

Figure 1:
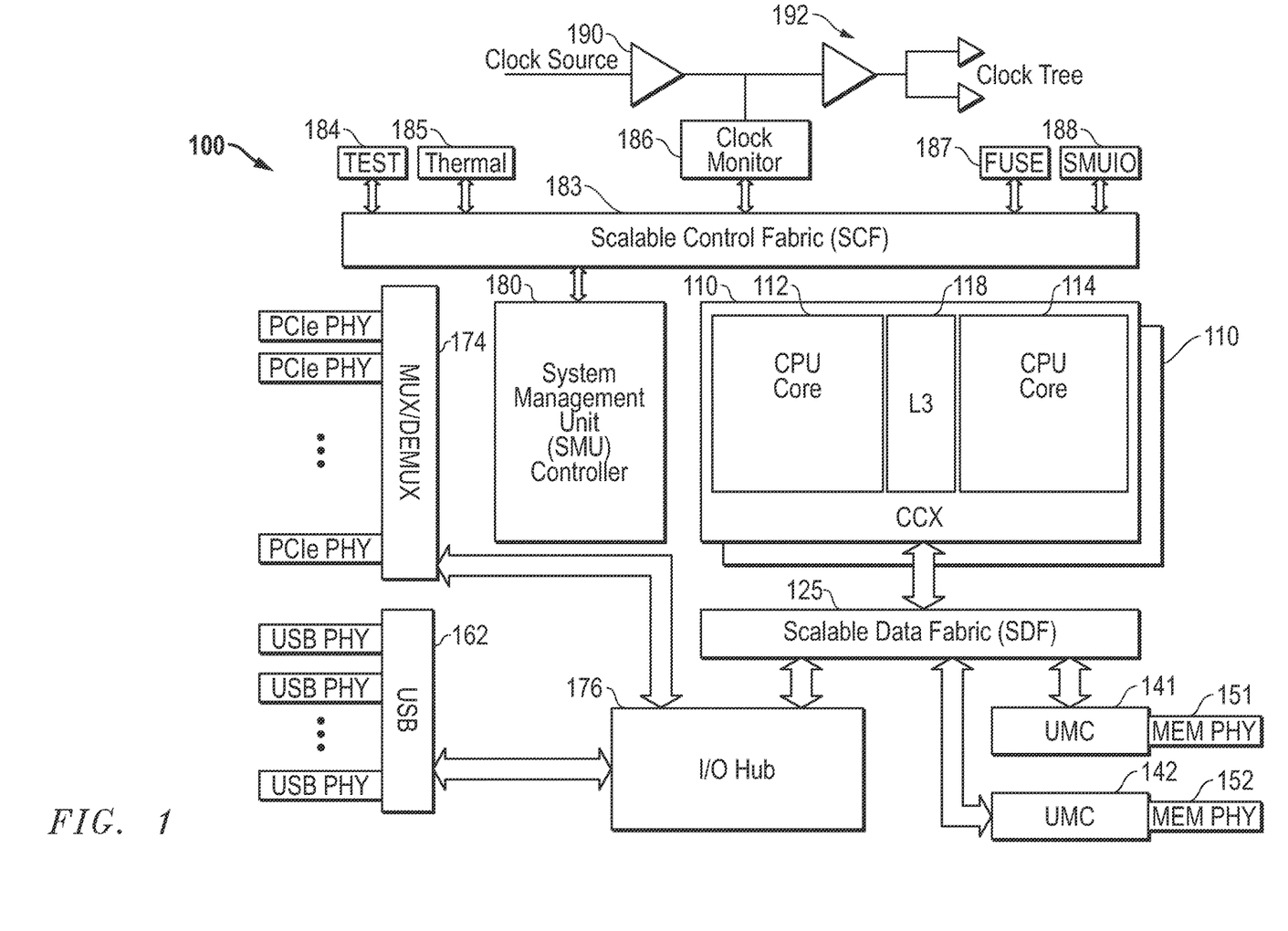
FIG. 1 illustrates in block diagram form an accelerated processing unit according to some embodiments.

FIG. 1 illustrates in block diagram form an accelerated processing unit (APU) 100. APU 100 is an integrated circuit suitable for use as a data processor in a host data processing system, and includes generally a central processing unit (CPU) core complex 110 including CPU cores 112 and 114, a scalable control fabric (SCF) 183, a system management unit controller (SMU) 180, a scalable data fabric 125, and numerous peripheral controllers. As will be appreciated by a person of ordinary skill, APU 100 may not have all of these elements present in every embodiment and, further, may have additional elements included therein. For example, graphics processing units (GPUs) are present in some embodiments, instead of or in addition to the CPU cores. Furthermore, APU 100 may be constructed of one or multiple integrated circuits in a system such as a multi-chip module.

CPU core complex 110 includes a CPU core 112 and a CPU core 114. Multiple CPU core complexes 110 are used. In this example, CPU core complex 110 includes two CPU cores, but in other embodiments CPU core complex 110 can include more CPU cores such as four, eight, or sixteen. Each of CPU cores 112 and 114 is bidirectionally connected to SCF 183 which forms a control fabric, and to SDF 125, and is capable of providing memory access requests and communication through SDF 125. In this embodiment, CPU cores 112 and 114 share certain resources of CPU core complex 110 such as the depicted level-three (L3) cache 118.

SDF 125 includes a crossbar switch for routing memory access requests and memory responses between any memory accessing agent and universal memory controllers (UMCs) 141 and 142. SDF 125 also includes a system memory map, defined by basic input/output system (BIOS), for determining destinations of memory accesses based on the system configuration, as well as buffers for each virtual connection.

A clock source provides a reference clock signal to a clock input circuit 190, which has an output connected to a clock tree 192 supplying a clock signal to drive various digital circuits throughout APU 100. The output of clock input circuit 190 is also connected to clock monitor circuit 186, which generally detects whether the reference clock signal is out of desired frequency range, as further described below.

SMU 180 is a local controller that controls the operation of the resources on APU 100 and synchronizes communication among them. SMU 180 manages power-up sequencing of the various processors on APU 100 and controls multiple off-chip devices via reset, enable and other signals. SMU 180 also manages power for the various processors and other functional blocks, and may receive measured power consumption values from CPU cores 112 and 114 and graphics core 120 to determine appropriate power states. SMU 180 communicates with various circuit blocks over SCF 183 for accomplishing system management, including a test block 184, a thermal monitoring block 185, clock monitor circuit 186, a fuse reading circuit 187, and a system management input/output (SMUIO) block 188. SMU 180 also implements various system monitoring and power saving functions. For example, if APU 100 becomes excessively hot, then SMU 180 can reduce the frequency and voltage of CPU cores 112 and 114. Thermal events can also be received from external sensors by SMU 180 via SCF 183, and SMU 180 can reduce the clock frequency and/or power supply voltage in response.

Peripheral Component Interconnect Express (PCIe) controller 174 and USB controller 162 are bidirectionally connected to an input/output (I/O) hub 176. PCIe controller includes a multiplexer/demultiplexer (MUS/DEMUX) adapted to route traffic to various PCIe physical layer circuits (PHYs). USB controller 162 is connected to plurality of USB PHYs. I/O hub 176 is bidirectionally connected to system hub 166 and to SDF 125. Thus, for example, a CPU core can program registers in USB controller 162, PCIe controller 174, or various other controllers (not shown), with accesses passing through SDF 125 routes and I/O hub 176.

Software and firmware for APU 100 are stored in a system data drive or system BIOS memory (not shown) which can be any of a variety of non-volatile memory types, such as read-only memory (ROM), flash electrically erasable programmable ROM (EEPROM), and the like. Typically, the BIOS memory is accessed through the PCIe bus, and the system data drive through a SATA interface.

Each of UMCs 141 and 142 are connected to SDF 125. UMCs 141 and 142 are connected to memory physical layer interfaces (PHYs) 151 and 152 can connect to state-of-the-art DDR memories such as DDR version four (DDR4), low power DDR4 (LPDDR4), graphics DDR version five (GDDR5), and high bandwidth memory (HBM), and can be adapted for future memory technologies. These memories provide high bus bandwidth and high speed operation, and provide low power modes to save power for battery-powered applications such as laptop computers, and also provide built-in thermal monitoring.

Figure 2:
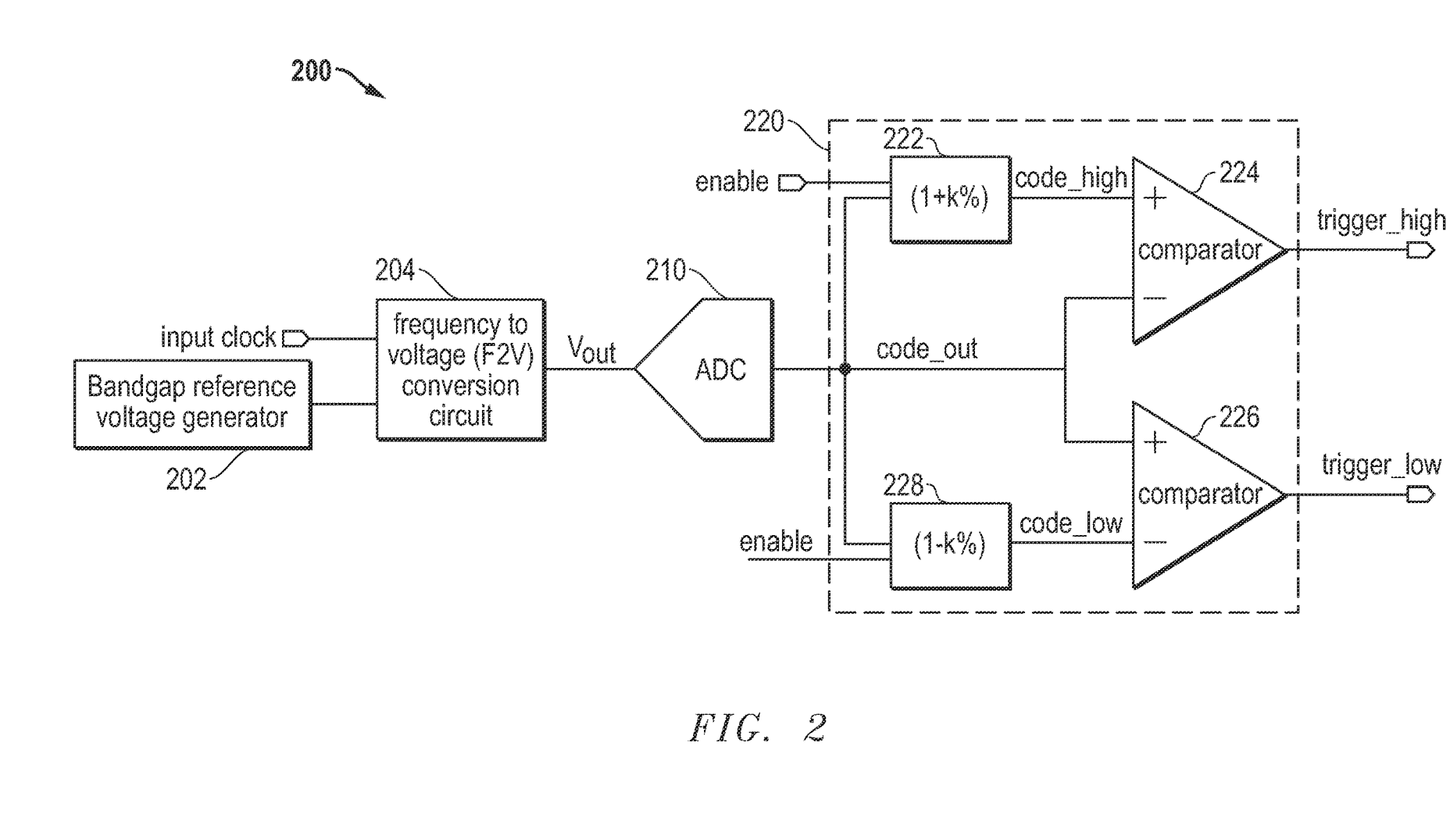
FIG. 2 illustrates in block diagram form a clock monitor circuit according to some embodiments.

FIG. 2 illustrates in block diagram form a clock monitor circuit 200 according to some embodiments. Clock monitor circuit 200 is suitable for use with APU 100 of FIG. 1, or other data processing systems which benefit from clock monitoring.

Figure 3:
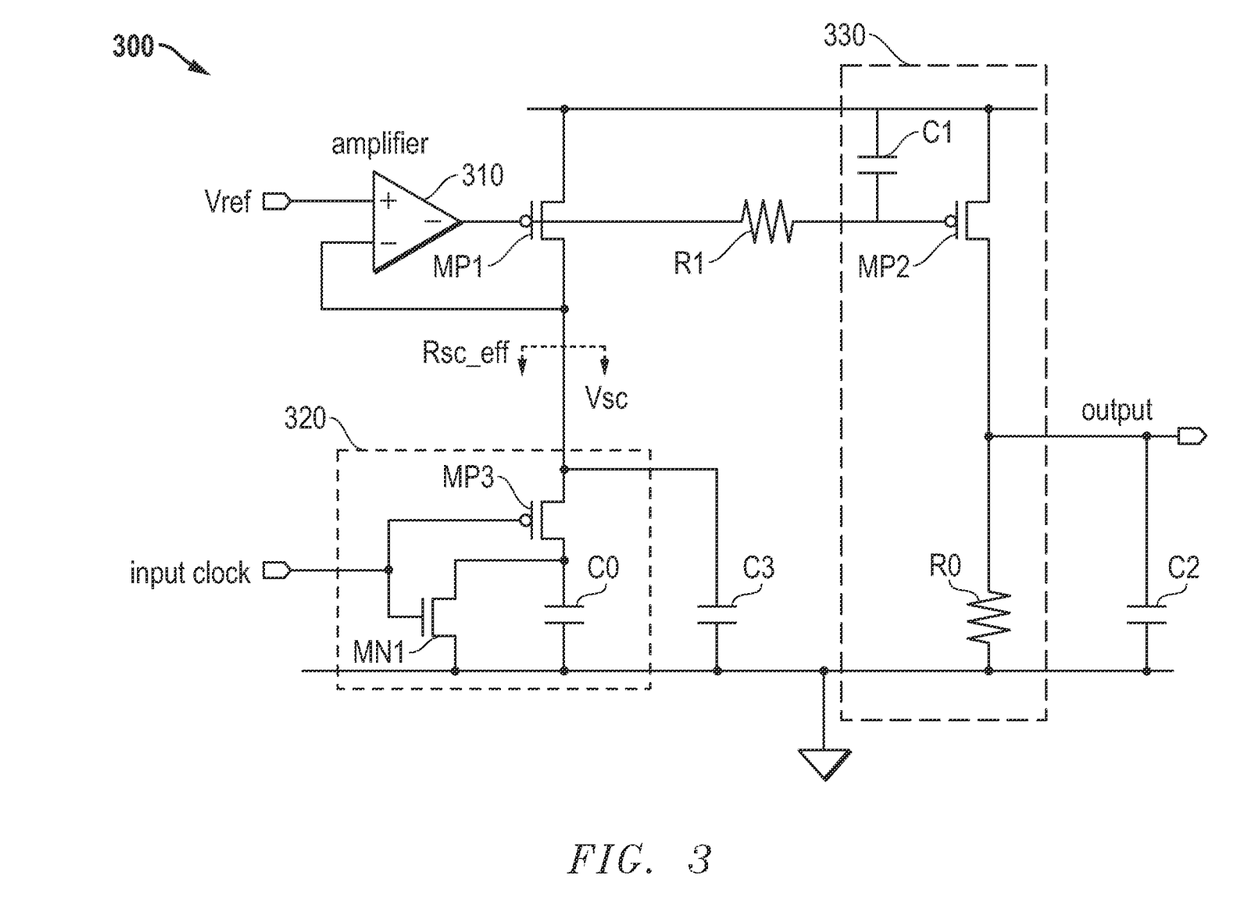
FIG. 3 illustrates in circuit diagram form a frequency-to-voltage conversion circuit according to some embodiments.

A bandgap reference voltage generator 202 generates a reference voltage which is fed to an input of frequency-to-voltage (F2V) conversion circuit 204. Another input of F2V conversion circuit 204 receives the input clock to be monitored. F2V conversion circuit 204 generates a DC voltage signal Vout with a voltage proportional to the input clock frequency (fclk). One suitable implementation of F2V conversion circuit 204 is shown in FIG. 3.

The voltage signal Vout is fed to an analog-to-digital converter (ADC) 210, which generates a digital signal "code_out" based on the direct current (DC) voltage level of voltage signal Vout. ADC 210 may be constructed with any suitable analog-to-digital converter implementations. The output of ADC 210 carrying the code_out signal is connected to an input of a digital monitoring circuit 220.

Digital monitoring circuit 220 has an input connected to the output of ADC 210, an enable input, an output carrying a "trigger_high" signal, and an output carrying a "trigger_low" signal. Included in digital monitoring circuit 220 is a first scaling circuit 222, a second scaling circuit 228, a first comparator 224, and a second comparator 226.

First scaling circuit 222 has a first input receiving digital signal code_out, a second input connected to the enable input for receiving an enable signal activating an initialization mode, and an output for providing a high threshold value "code_high". Second scaling circuit 228 has a first input receiving digital signal code_out, a second input connected to the enable input for receiving an enable signal activating the initialization mode, and an output for providing a high threshold value "code_low". Two comparators 224 and 226 operate each have a first input receiving the code_out signal, and second inputs receiving the code_high and code_low signals, respectively. The outputs of comparators 224 and 226 provide the trigger_high and trigger_low signals, respectively.

In operation, when the enable signal puts first scaling circuit 222 into the initialization mode, it scales the digital signal code_out using a first configurable ratio, in this case 1+k %, where k is a configurable value, to produce a high threshold value communicated by the code_high output signal. During the initialization mode, the input clock signal (which is typically the host processor's reference clock signal) is controlled such that it is known to be at or near its designed default frequency of operation. The first configurable ratio is provided with a register or other configurable setting, and is selected based on system design parameters related to the maximum desired increase in clock frequency for the input clock.

Second scaling circuit 228 is enabled similarly to first scaling circuit 228, and in operation scales the digital signal code out by a second configurable ratio, in this case 1−k %, to produce a low threshold value communicated by the code_low output signal. The second configurable ratio is also provided through a register or other configurable setting and is selected based on system design parameters related to the maximum desired decrease in clock frequency for the input clock.

When the enable signal is altered to change the two scaling circuits 222 and 228 from the initialization mode to an operating mode, both scaling circuits cease to scale the digital signal and instead maintain their respective high and low threshold values code_high and code_low at their outputs. In this operating mode, comparators 224 and 226 operate to monitor the code_out signal, comparing it to the code_high and code_low signals to determine if the input clock frequency has varied beyond the desired limits. The output signal of comparator 224, the trigger_high signal, serves as an overclock alert that is fed to SMU 180 (FIG. 1), and will be 1 when the input clock frequency is k % higher than its default frequency, and zero when the input clock frequency is not. The output signal of comparator 226, trigger_low, serves as an underclock alert, and similarly will be 1 when the input clock frequency is k % lower.

Clock monitoring circuit 200 has the advantage that it is efficient in both power consumption and circuit area, while providing highly linear and accurate monitoring of a clock signal frequency. Clock monitoring circuit 200 also has the advantage that the thresholds for frequency variation are configurable with one or two inputs in a simple manner to allow use with various clock frequencies in systems with various clock variation tolerances. Each portion of the depicted clock monitoring circuit 200 is self-calibrated during initialization, so no fuse burning or other factory calibration is needed to address part-to-part device variations. Clock monitoring circuit 200 is also tolerant to process, power supply and temperature variations, again without requiring factory calibration or fuse burn-in.

While in this embodiment, comparators 224 and 226 are constructed as digital circuits, other embodiments can use other suitable designs. For example, some embodiments provide the code_out, code_high, and code_low signals to a processor such as SMU 180, which makes a similar comparison by loading current values of the signals into registers and comparing them with a processor command. Furthermore, while this embodiment uses a percentage value k to configure the ratio by which to scale digital signal code_out, other embodiment provide separate values for setting the scaling ratio at scaling circuits 222 and 228.

FIG. 3 illustrates in circuit diagram form a F2V conversion circuit 300 according to some embodiments. F2V conversion circuit 300 is suitable for use in clock monitor circuit 200 (FIG. 2) and other similar clock monitoring circuits.

F2V conversion circuit 300 includes an amplifier 310 having a positive input terminal receiving a reference voltage, such as that provided by bandgap reference voltage generator 202 (FIG. 2). Amplifier 310 has an output terminal connected to a gate of a first P-type metal oxide semiconductor (PMOS) transistor MP1, and a negative input terminal connected to a drain of the first PMOS transistor MP1. Amplifier 310 operates with feedback amplification to control the current through first PMOS transistor MP1 to constantly attempt to equalize the voltage Vsc at the negative input terminal with reference voltage Vref at the positive input terminal, thereby driving a current through switched capacitor circuit 320.

A capacitor C3 is connected between the drain of first PMOS transistor MP1 and the low voltage rail. The value of capacitor C3 is typically selected to be much bigger than that of capacitor C0, to maintain the average voltage at Vsc node. This provides that, in operation, the switch-capacitor charging and discharging of C0 does not shift the DC operating point for operation of amplifier 310.

A current mirror circuit 330 includes a second PMOS transistor MP2 with a gate coupled to the gate of first PMOS transistor MP1 through resistor R1. A capacitor C1 is connected between the gate of second PMOS transistor MP2 and the high voltage rail. A resistor R0 is connected between the drain of second PMOS transistor MP2 and the low voltage rail.

Switched capacitor circuit 320 is connected between the drain of first PMOS transistor MP1 and the low voltage rail, and operates to charge and discharge a capacitor C0 on a cycle controlled by the input clock signal. Switched capacitor circuit 320 includes a third PMOS transistor MP3 with a gate receiving the clock signal, a source connected to the drain of first PMOS transistor MP1, and a drain connected to a positive terminal of capacitor C0. An N-type metal oxide semiconductor (NMOS) transistor MNI has a gate receiving the input clock signal, a drain connected to the positive terminal of capacitor C0, and a source connected to the low voltage rail.

In operation, NMOS transistor MN1, third PMOS transistor MP3, and capacitor C0 provide switched-capacitor operation such that when the input clock signal is high, NMOS transistor MN1 discharges capacitor C0 and when the input clock signal is low, third PMOS transistor MP3 charges capacitor C0. The effective resistance of the switched capacitor circuit seen at the source of third PMOS transistor MP3 is labeled Rsc_eff, and the voltage there is labeled Vsc. Resistance Rsc_eff varies based on the switch-capacitor operation, and depends on the input clock signal frequency $f_{clk}$ as given by Eq. (1):

$$\text{Rsc\_eff} = \frac{1}{f_{clk} C_0} \quad (1)$$

Amplifier 310, first PMOS transistor MP1, capacitor C3 and the switched-capacitor circuit form a closed loop, from which the loop gain forces the voltage Vsc to equal to Vref, with the resulting current $I_{MP1}$ flowing through MP1 described by Eq. (2):

$$I_{MP1} = \frac{Vsc}{Rsc} = \frac{Vref}{\frac{1}{f_{clk} C_0}} = Vref \cdot f_{clk} \cdot C_0 \quad (2)$$

Second PMOS transistor MP2 operates to mirror the current through first PMOS transistor MP1 and develop a voltage Vout at the output terminal when connecting to load resistor $R_0$ as given by Eq. (3):

$$Vout = I_{MP1} \cdot R_0 = Vref \cdot f_{clk} \cdot C_0 \cdot R_0 \quad (3)$$

In Eq. (3), because Vref provided from bandgap reference voltage generator or other reference voltage generator, and resistor R0 and capacitor C0 also have fixed values for a given chip, it is shown that Vout linearly scales with the input clock frequency $f_{clk}$.

Resistor R1 and capacitors C1 and C2 perform low pass filtering to smooth out ripples due to switching capacitor operations. Based on the equation for Vout and input clock frequency default value given above, the target values of resistor R0 and capacitor C0 are selected during design of F2V conversion circuit 300 to operate around the input clock frequency's default value. For example, in one embodiment with an input clock frequency default value of 100 MHz, C0=100 fF (fempto-farads), R0=100 kOhm (kilo-ohms), and Vout is biased at Vref. Because clock frequency variations manifest as variations in the output voltage Vout of F2V conversion circuit 300, when a suitable supply voltage on the high voltage rail is selected, for example 1.8V, and the output voltage Vout nominal level is centered at half the power supply voltage, a wide detectable frequency range is achieved.

F2V conversion circuit 300 has the advantage that it provides highly linear tracking of a clock frequency while being power and space efficient. F2V conversion circuit 300 also has a high tolerance of process variations resulting from several factors. First, the closed-loop gain of the amplifier 310 in the depicted arrangement is high even in the presence of MOS device variations. The current mirror circuit 330 is also tolerant of process variation with adequate headroom in the voltage output. Furthermore, while process variations of R and C values can lead to variations of initial F2V circuit 300 output, such variations manifest in terms of the F2V conversion coefficient, which applies equally to the initial default clock frequency and variations during operation.

Figure 4:
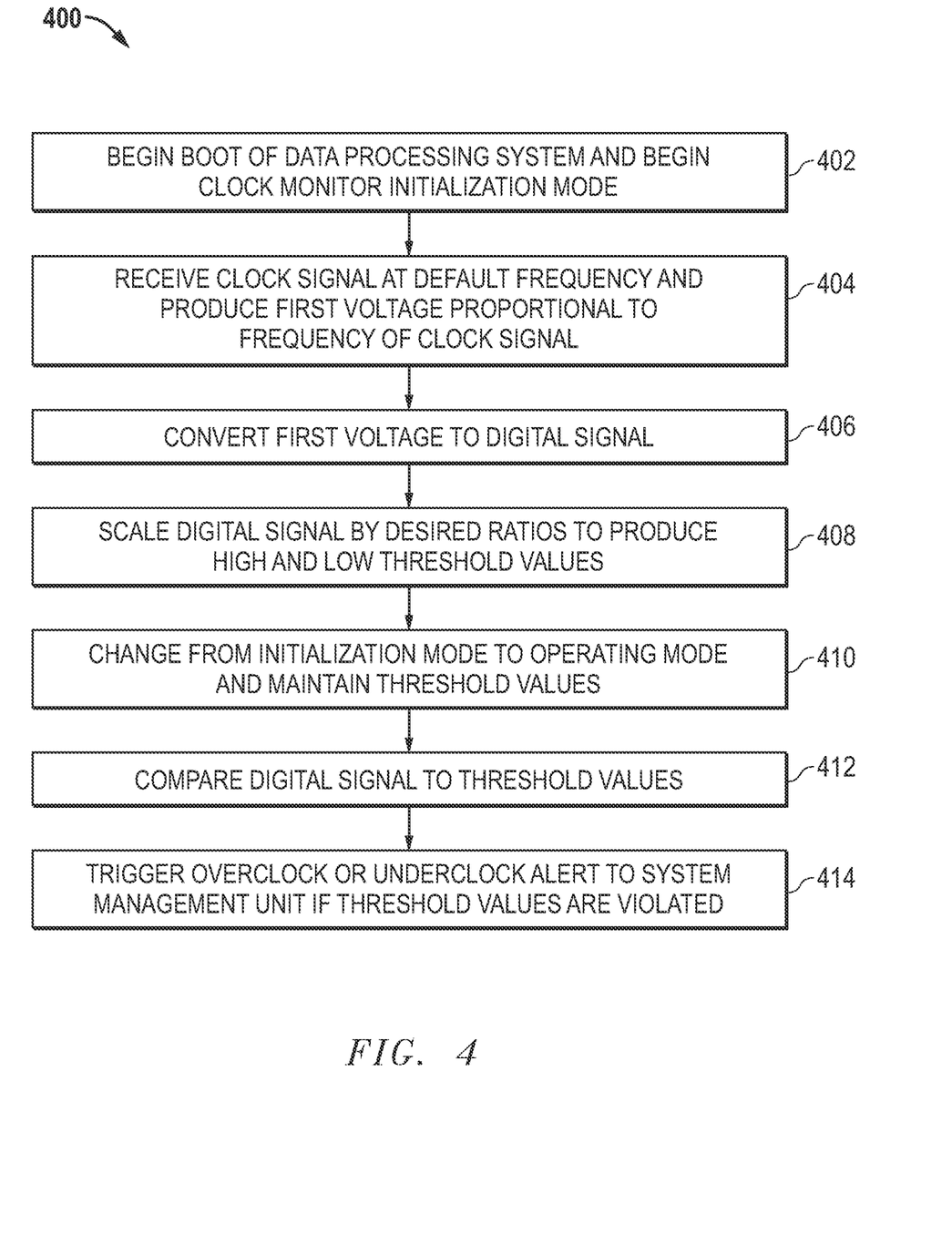
FIG. 4 is a flow chart of a process for monitoring a clock signal according to some embodiments.

FIG. 4 is a flow chart 400 of a process for monitoring a clock signal according to some embodiments. In this embodiment, the process is conducted at a data processor under control of SMU 180 and employs a clock monitoring circuit as described herein.

The process begins at block 402 where during the boot process of a host data processing system, or during a system initialization or reset process following the boot process, the clock monitor circuit is placed in initialization mode by setting the enable signal to digital monitoring circuit 220 (FIG. 2) to a designated enabled value, typically a logical high.

At block 404, the process includes receiving the clock signal, typically a reference clock signal as described above, with a frequency stable at the clock signal's default clock frequency achieved by providing a power supply which is not under a heavy load and other conditions present when the system is not under a heavy processing load, such as low electrical noise and a stable temperature. With the clock signal, the process produces a first voltage proportional to the frequency of the clock signal. In this embodiment, a F2V conversion circuit such as circuit 300 (FIG. 3) is used to produce the first voltage.

At block 406, the process converts the first voltage to a digital signal using an analog-to-digital converter. Any suitable bit length and format can be employed for the digital signal in various embodiments. The choice of bit length depends on the desired accuracy for threshold detection.

At block 408, the process includes scaling the digital signal by desired ratios to produce high and low threshold values. In this embodiment scaling circuits 222 and 228 (FIG. 2) are used to perform the scaling. The ratios are configurable as described above and can be provided separately or together in various embodiments.

Next at block 410, when changing from the initialization mode to an operating mode, the process ceases to scale the digital signal and maintains the high and low threshold values. In this embodiment, the change is achieved by changing the enable signal for scaling circuits 222 and 228 to a disabled value.

During the operating mode, at block 412, the process compares the digital signal to the high threshold value to determine if the clock signal has been increased in frequency beyond a desired level. The comparison is performed continuously or regularly during operation to monitor the clock frequency for excessive variation.

If the digital signal varies to a value higher than the high threshold or lower than the low threshold, the process triggers an overclock alert or underclock alert to a system management circuit of the data processor such as SMU 180.

APU 100 of FIG. 1, clock monitor circuit 200 of FIG. 2, or any portions thereof, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates that also represent the functionality of the hardware comprising integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

The techniques herein may be used, in various embodiments, with any suitable systems that can benefit from a clock monitoring circuit and process that is power and space efficient. Further, the techniques herein are broadly applicable for use with processors implemented with CPUs and acceleration processors.

While particular embodiments have been described, various modifications to these embodiments will be apparent to those skilled in the art. Accordingly, it is intended by the appended claims to cover all modifications of the disclosed embodiments that fall within the scope of the disclosed embodiments.

What is claimed is:

1. A clock monitor comprising:
   a frequency to voltage conversion circuit having a first input receiving a reference voltage, a second input receiving a clock signal having a frequency, and an output providing an output voltage proportional to the frequency of the clock signal;
   an analog to digital converter having an input receiving the output voltage of the frequency to voltage conversion circuit and producing a digital signal representing the output voltage; and
   a digital monitoring circuit operable for:
      during an initialization mode, scaling the digital signal using a first configurable ratio to produce a high threshold value;
      when changing from the initialization mode to an operating mode, ceasing to scale the digital signal and maintaining the high threshold value; and
      during the operating mode, comparing the digital signal to the high threshold value to determine if the clock signal has been increased in frequency beyond a desired level, and if so, triggering an overclock alert.

2. The clock monitor of claim 1, wherein the digital monitoring circuit is further operable for:
   during the initialization mode, scaling the digital signal using a second configurable ratio to produce a low threshold value;
   when changing from the initialization mode to the operating mode, maintaining the low threshold value; and
   during the operating mode, comparing the digital signal to the low threshold value to determine if the clock signal has been decreased in frequency beyond a desired level, and if so, triggering an underclock alert.

3. The clock monitor of claim 1, wherein the digital monitoring circuit comprises
a first scaling circuit having a first input receiving the digital signal, a second input receiving an enable signal activating the initialization mode, and an output providing the high threshold value; and
a first comparator having a first input receiving the high threshold value, a second input receiving the digital signal, and an output, the first comparator operable to trigger the overclock alert at the output if the digital signal becomes higher than the high threshold value.

4. The clock monitor of claim 1, wherein the frequency to voltage conversion circuit comprises:
an amplifier receiving having a positive input terminal receiving the reference voltage, an output terminal coupled to a gate of a first P-type metal oxide semiconductor (PMOS) transistor, and a negative input terminal coupled to a drain of the first PMOS transistor;
a switched capacitor circuit coupled between the drain of the first PMOS transistor and a low voltage rail and operable to charge and discharge a first capacitor on a cycle controlled by the clock signal; and
a current mirror circuit having a second PMOS transistor with a gate coupled to the gate of the first PMOS transistor, a second capacitor coupled between the gate of the second PMOS transistor and a high voltage rail, and a first resistor coupled between the drain of the second PMOS transistor and the low voltage rail, the current mirror circuit operable to mirror current passing through the switched capacitor circuit to produce an output voltage across the first resistor proportional to the frequency of the clock signal.

5. The clock monitor of claim 4, wherein the switched capacitor circuit comprises:
a third PMOS transistor having a gate receiving the clock signal, a source coupled to the drain of the first PMOS transistor, and a drain coupled to a positive terminal of the first capacitor; and
an N-type metal oxide semiconductor (NMOS) transistor having a gate receiving the clock signal, a drain coupled to the positive terminal of the first capacitor, and a source coupled to the low voltage rail.

6. The clock monitor of claim 4, further comprising a third capacitor coupled between the drain of the first PMOS transistor and the low voltage rail.

7. The clock monitor of claim 1, further comprising a bandgap reference circuit supplying the reference voltage.

8. A method of monitoring a clock for a data processor, the method comprising:
receiving a clock signal and producing a first voltage proportional to a frequency of the clock signal;
converting the first voltage to a digital signal;
during an initialization mode, ensuring the clock signal is at a desired frequency and scaling the digital signal using a first configurable ratio to produce a high threshold value;
when changing from the initialization mode to an operating mode, ceasing to scale the digital signal and maintaining the high threshold value;
during the operating mode, comparing the digital signal to the high threshold value to determine if the clock signal has been increased in frequency beyond a desired level; and
if so, triggering an overclock alert to a system management circuit of the data processor.

9. The method of claim 8, further comprising:
during the initialization mode, while the clock is at the desired frequency, scaling the digital signal using a second configurable ratio to produce a low threshold value;
when changing from the initialization mode to the operating mode, maintaining the low threshold value; and
during the operating mode, comparing the digital signal to the low threshold value to determine if the clock signal has been decreased in frequency beyond a desired level and if so, triggering an underclock alert.

10. The method of claim 8, wherein producing a voltage proportional to the frequency of the clock signal comprises:
driving a switched capacitor circuit with the clock signal to charge and discharge a first capacitor on a cycle controlled by the clock signal;
supplying current to the switched capacitor circuit with a feedback-controlled circuit operable to receive a reference voltage and maintain the reference voltage across the switched capacitor circuit during the cycle; and
mirroring the current supplied to the feedback-controlled circuit at a current mirror circuit to produce an output voltage across a first resistor proportional to the frequency of the clock signal.

11. The method of claim 10, further comprising supplying the reference voltage from a bandgap reference circuit.

12. The method of claim 8, wherein comparing the digital signal to the high threshold value is performed with a processor.

13. The method of claim 8, wherein comparing the digital signal to the high threshold value is performed with a digital comparator circuit.

14. A processor comprising:
a processor core;
a clock generation circuit receiving a reference clock signal and providing a system clock signal based on which the processor core operates;
a reference clock monitor comprising:
a frequency to voltage conversion circuit having a first input receiving a reference voltage, a second input receiving the reference clock signal, and an output providing an output voltage proportional to a frequency of the reference clock signal;
an analog to digital converter having an input receiving the output voltage of the frequency to voltage conversion circuit and producing a digitals signal representing the output voltage; and
a digital monitoring circuit operable for (i) during an initialization mode, scaling the digital signal using a first configurable ratio to produce a high threshold value; (ii) when changing from the initialization mode to an operating mode, ceasing to scale the digital signal and maintaining the high threshold value; and (iii) during the operating mode, comparing the digital signal to the high threshold value to determine if the reference clock signal has been increased in frequency beyond a desired level, and if so, triggering an overclock alert.

15. The processor of claim 14, wherein the digital monitoring circuit is further operable for:
during the initialization mode, scaling the digital signal using a second configurable ratio to produce a low threshold value;
when changing from the initialization mode to the operating mode, maintaining the low threshold value; and
during the operating mode, comparing the digital signal to the low threshold value to determine if the reference clock signal has been decreased in frequency beyond a desired level and if so, triggering an underclock alert.

16. The processor of claim 14, wherein the digital monitoring circuit comprises
   a first scaling circuit having a first input receiving the digital signal, a second input receiving an enable signal activating the initialization mode, and an output providing the high threshold value; and
   a first comparator having a first input receiving the high threshold value, a second input receiving the digital signal, and an output, the first comparator operable to trigger the overclock alert at the output if the digital signal becomes higher than the high threshold value.

17. The processor of claim 14, wherein the frequency to voltage conversion circuit comprises:
   an amplifier receiving having a positive input terminal receiving the reference voltage, an output terminal coupled to a gate of a first P-type metal oxide semiconductor (PMOS) transistor, and a negative input terminal coupled to a drain of the first PMOS transistor;
   a switched capacitor circuit coupled between the drain of the first PMOS transistor and a low voltage rail and operable to charge and discharge a first capacitor on a cycle controlled by the reference clock signal; and
   a current mirror circuit having a second PMOS transistor with a gate coupled to the gate of the first PMOS transistor and a first resistor coupled between the drain of the second PMOS transistor and the low voltage rail, the current mirror circuit operable to mirror current passing through the switched capacitor circuit to produce an output voltage across the first resistor proportional to the frequency of the reference clock signal.

18. The processor of claim 17, wherein the switched capacitor circuit comprises:
   a third PMOS transistor having a gate receiving the reference clock signal, a source coupled to the drain of the first PMOS transistor, and a drain coupled to a positive terminal of the first capacitor; and
   an N-type metal oxide semiconductor (NMOS) transistor having a gate receiving the reference clock signal, a drain coupled to the positive terminal of the first capacitor, and a source coupled to the low voltage rail.

19. The processor of claim 17, further comprising a third capacitor coupled between the drain of the first PMOS transistor and the low voltage rail.

20. The processor of claim 14, further comprising a bandgap reference circuit supplying the reference voltage.

* * * * *